Patented May 27, 1952

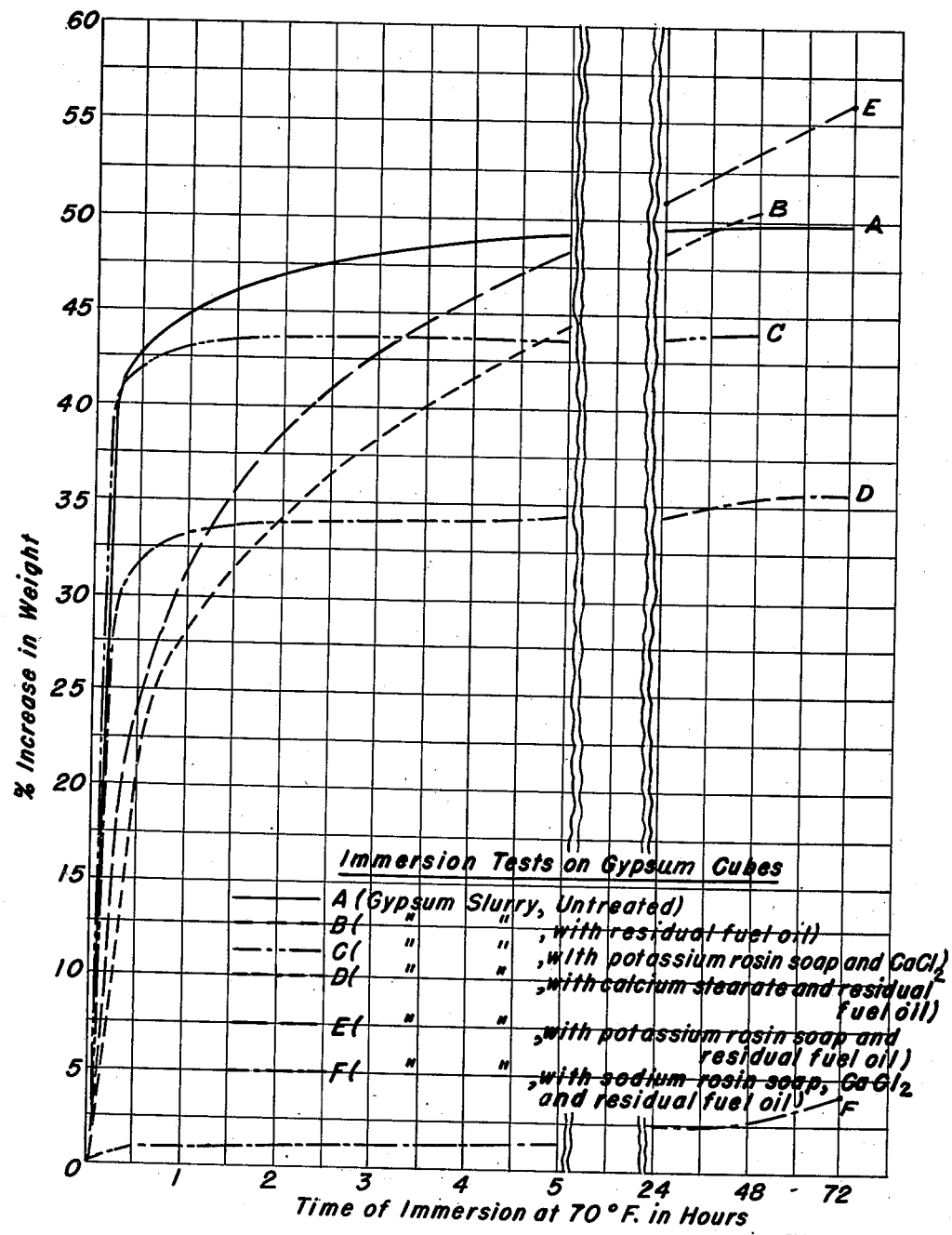

2,597,901

UNITED STATES PATENT OFFICE 2,597,901

WATER REPELLENT GYPSUM PRODUCT AND PROCESS OF MAKING SAME

Wallace C. Riddell, Berkeley, and George B. Kirk, Redwood City, Calif., assignors to Henry J. Kaiser Company, a corporation of Nevada Application August 31, 1950, Serial No. 182,526

20 Claims. (Cl. 154—45.9)

This invention relates to the preparation of water-resistant, or water-repellent, cementitious products; and, especially, it relates to the production of water-resistant gypsum compositions, such as gypsum wallboard, gypsum tile and other gypsum products.

Earlier workers in this field have developed or proposed many methods for increasing the water-resistance or water-repellency of gypsum products, especially wallboard, which, for example, would enable use of the latter as sheathing material in the construction industry. Included in such methods have been processes wherein materials imparting water-resistance or water-repellency were incorporated in the gypsum slurry during the process of manufacture, as well as coating of the finished product with a waterproofing material. The disadvantage of the latter method is that any break in the surface will permit water penetration and absorption. The incorporation of water-repellency agents within the slurry is an advance in the art, but has entailed certain disadvantages. In some of the processes so proposed, melting or fusing of the ingredients has been required, which is a limitation on their utility. In other processes, where for instance, it is proposed to incorporate a water-insoluble lime soap, there is a problem of obtaining sufficiently thorough interdispersion, relatively large amounts are required and water-repellency is not satisfactory where exposure is fairly severe.

According to the present invention it has now been found that the above disadvantages are overcome and a water-resistant or water-repellent gypsum product is obtained by incorporating in the calcined gypsum residual fuel oil, an alkali metal rosin soap, or alkali metal soap of abietic acid, and a water-soluble alkaline earth salt, for example, a water-soluble salt of calcium, magnesium, barium, or strontium. From about 1.0% to about 2.0% of the alkali metal soap is admixed and from about 0.5% to about 1.0% of the soluble alkaline earth salt. There is added from 5% to 10% of residual fuel oil. These percentages, as used in the specification and the appended claims, are by weight, calculated on the dry weight of the total unset gypsum composition. Somewhat higher amounts of the ingredients can be employed without detriment, but excellent water-repellency is obtained within these ranges and increased amounts result in increased costs.

The term "residual fuel oil" as employed in this specification and claims means the heavier residual liquid fraction of petroleum, such as Bunker C oil, heavy fuel oil and equivalent heavy petroleum fractions; but it excludes the lighter fractions including gasoline, kerosene and diesel oils, on the one hand, and the solid residues of processing, including waxes and asphalt, on the other hand. One sort of residual fuel oil employed herein is a petroleum fraction which has a specific gravity of from 7.4 to 8.8, American Petroleum Institute (method) at 60° F.; and a flash point (closed cup) of from 205° F. to 212° F. It contains, upon analysis, approximately 85% carbon and 10% hydrogen, the remainder being water, sulfur, nitrogen, ash, etc. However, other equivalent heavy petroleum oils can be employed.

The rosin soaps, or abietates, employed in this invention are obtained from rosin, or colophony, which is the solid residue recovered in the processing of pine wood, or of the wound exudations from pine trees, by methods well known to the art. The raw material, for instance, is subjected to steam and solvent extraction, or is steam distilled as in the case of the gum exudate, and turpentine is recovered in one fraction and rosin in the other fraction or residue. The chief component of the rosin is abietic acid, which is present therein in an average amount of about 80% by weight. The alkali metal rosin or abietic acid soaps, such as the potassium, sodium and other alkali soaps, are water-soluble, and can be prepared by heating mixtures of rosin and caustic soda, caustic potash, soda ash, potassium carbonate or the like, or solutions of the alkali metal basic compounds. The soaps are available in commerce. The alkali metal abietate can be employed in this invention, as stated, or the alkali metal rosin soap can be used. In the latter case, the soap is not pure abietate but it is quite effective and sometimes less expensive. The rosin soap or abietate can be dissolved in water and added in the calcined gypsum mixture, or it can be added in the slurry and dissolved in the slurrying water. Mixtures of the rosin soaps can be employed.

The alkaline earth salt useful in this invention is a salt which is soluble in water and there can be employed calcium chloride, calcium nitrate, calcium iodide, calcium acetate, calcium propionate, calcium bromate or other water-soluble calcium salt, or magnesium chloride, magnesium sulfate or other water-soluble magnesium salt; or barium chloride, strontium nitrate or other water-soluble salt of these metals. Mixtures of the soluble salts can be employed. The calcium or magnesium salts are especially suitable because they are efficient, cheaper, readily available, and not injurious to health.

The constitutents above noted can be admixed with the calcined gypsum in various ways. The gypsum and oil can be admixed and the mixture then subjected to calcination to dehydrate the gypsum and form the desired calcium sulfate hemihydrate, for example, by heating to about 170° C. (340° F.). Alternatively, the oil can be mixed with the dry calcined gypsum by grinding these components together, or by mixing in a screw conveyor or other suitable mixing device; or the oil can be mixed with the slurry of calcined gypsum. The rosin soaps are generally available in commerce, for example, the potassium rosin soap is sold as a thick liquid or semi-solid and the sodium rosin soap as a powder; and such soap can be mixed, if desired, with the dry calcined gypsum prior to slurrying. Alternatively, and preferably, the soap is dissolved in water, for example, in the slurrying water, and then admixed. The alkaline earth salt can be mixed with the calcined gypsum prior to slurrying, or, preferably, can be dissolved in water and then admixed in slurrying; or it can be mixed into the slurry. Preferably, each water-soluble ingredient is dissolved in water, and the solutions and the oil are mixed with the slurry of calcined gypsum, as being most convenient and economical of time and labor. The slurry mixture is suitably formed into shape, for example, by casting, and is dried. Drying can be carried out at elevated temperatures or at room or atmospheric temperature.

It is a particular advantage of the present invention that the additives employed are readily blended into the mix, and do not require comminution or fusion. The oil employed does not volatilize off in the drier, which would require either recovery of the volatilized material or proper disposal of the fumes or gases. It is also an advantage that the solution of the alkali metal rosin soap and the solution of calcium salt disperse rapidly and thoroughly in the aqueous gypsum slurry. It is a further advantage of the process that the water-repellency additives are effective without the necessity for drying the gypsum products at higher temperatures. This enables production of water-repellent blocks of gypsum, or of structural elements, such as roofs or floors, which are cast and dried at the site of use under circumstances where the employment of elevated drying temperatures is not economically feasible.

The attached drawing demonstrates the advantageous results obtained by the present invention and compares the water-repellency effects obtained with the combined additives claimed, with those obtained where one or more of the additives are omitted. In the figure are shown graphically the changes in water-absorption with respect to time of immersion in water; and the values were obtained by tests performed in the following manner. An amount of calcined gypsum is divided into several portions. One portion, A, is made into a slurry with water in the manner known to the art, and the slurry is cast into cubes, two inches on an edge, and the cubes are dried at about 115° F. Another portion of the gypsum, B, is made into a slurry in the same way and there is also added with thorough mixing 10% of residual fuel oil, and the cubes are cast and dried as above. A third portion, C, is also made into a slurry in the same way, but with the thorough admixture of 2% of potassium rosin soap (in water solution) and 0.7% of $CaCl_2$ (in water solution), cast into cubes and dried as above. A fourth portion, D, is slurried in the same way, but with the thorough admixture of 2% of calcium stearate and 10% of residual fuel oil, and the slurry cast into cubes and dried as above. A fifth portion, E, is also slurried in the same way, but there is thoroughly admixed with the slurry 3% of potassium rosin soap (in water solution) and 10% of residual fuel oil, cubes cast and dried as above. A sixth portion, F, is made into a slurry in the same way, except that there is admixed 2.0% sodium rosin soap (in water solution), 0.7% $CaCl_2$ (in water solution) and 10% of fuel oil, and cubes are cast therefrom and dried as above.

All sets of cubes are tested for water absorption by immersing in water of such depth that a one-inch head is maintained above the pieces, at a temperature of 70° F., for periods of time as shown on the figure. At the end of the respective periods of immersion, test cubes are examined to determine the amount of water absorbed, and these values, up to 72 hours, are plotted to give the curves shown in the figure. As demonstrated by the figure, whereas some varying amount of water-repellency is achieved in the mixes B to E, as compared with the untreated stucco, A, the effect in no case is comparable with that obtained with the combined additives of the present invention.

The following examples will illustrate more clearly the method of carrying out the present invention, and the improved products obtained thereby. In one example, calcined gypsum is admixed with 2% of potassium abietate in the form of a very viscous liquid containing 70% solids, the remainder being water, and with 10% residual fuel oil. This dry mix is then added, with thorough stirring, to the slurrying water, which contains 0.7% of calcium chloride. The slurry is cast into the form of boards in the conventional manner on a wallboard machine, whereby gypsum core material is disposed within fibrous liners; and the boards are dried at a temperature of 200° F. The half-inch board is cut into 6" x 6" sections and the sections subjected to the immersion test above described. The following results are obtained

| Time of Immersion at 70° F. | Absorption percent by weight |
|---|---|
| 30 min | 2.6 |
| 1 hour | 3.4 |
| 2 hours | 3.5 |
| 3 hours | 6.5 |
| 6 hours | 7.6 |

Gypsum board made without the addition of a water-proofing or water-repellency agent, and similarly tested, showed a water absorption, or increase in weight, of over 45% after 5 hours immersion.

In a series of tests, water slurries of calcined gypsum are prepared and there are added in the respective mixes the water-repellent agents, and in the amounts, indicated. The table below shows the water-repellency exhibited by cubes, 2 inches on an edge, cast from the respective slurries and dried at 115° F. Water absorption is shown as determined after immersion in water at 70° F., as described above, and for the periods of time stated.

Table

| Period of Immersion | Test 1—No Additive | Test 2—2% K rosin soap, 0.7% CaCl₂, 5% residual fuel oil | Test 3—2% K rosin soap, 0.7% Ca acetate, 5% residual fuel oil |
| --- | --- | --- | --- |
| | Percent | Percent | Percent |
| 10 min | 36.6 | 9.3 | 0.6 |
| 30 min | 44.1 | 13.2 | 0.9 |
| 1 hour | 44.5 | 13.2 | 0.9 |
| 2 hours | 45.3 | 12.6 | 0.9 |
| 3 hours | 48.1 | 11.8 | 1.0 |
| 5 hours | 49.2 | 11.8 | 1.2 |
| 24 hours | 49.7 | 13.2 | 1.9 |
| 48 hours | 49.8 | 14.2 | 3.7 |
| 72 hours | 49.9 | 15.8 | 5.9 |

| Period of Immersion | Test 4—2% K rosin soap, 0.7% Ca(NO₃)₂, 10% residual fuel oil | Test 5—2% K rosin soap, 0.7% MgCl₂, 10% residual fuel oil | Test 6—1% Na rosin soap, 0.7% CaCl₂, 10% residual fuel oil |
| --- | --- | --- | --- |
| | Percent | Percent | Percent |
| 10 min | 2.2 | 0.6 | 0.8 |
| 30 min | 4.4 | 1.1 | 0.9 |
| 1 hour | 6.3 | 1.1 | 1.8 |
| 2 hours | 6.7 | 0.8 | 2.9 |
| 3 hours | 7.1 | 1.2 | 3.6 |
| 5 hours | 6.7 | 1.3 | 3.8 |
| 24 hours | 7.5 | 2.0 | 5.7 |
| 48 hours | 9.0 | 3.7 | 7.5 |
| 72 | 10.9 | 6.0 | 9.6 |

The above table shows the excellent water-repellency exhibited by gypsum products made according to the present invention.

In a variation, it has also been discovered that the addition of form about 0.1% to about 0.5% of a dispersing agent is advantageous in enabling the production of still further improved water-repellency when working according to this invention. Dispersing agents which have been found to be useful in this invention are, for instance, neutral sodium salts of condensed aryl sulfonic acids, sodium salts of condensed mono-naphthalene sulfonic acid, waste sulfite liquor obtained in the wood pulp industry, lignone sulfonate and the like.

In an example, to a water slurry of calcined gypsum there are added, with thorough stirring, 2.0% potassium rosin soap (in water solution), 0.7% CaCl₂ (in water solution), 10% residual fuel oil, and 0.5% lignin sulfonic acid. Two-inch cubes, as above, are cast of this slurry and are dried at 115° F., after which they are tested for water absorption in the manner described above. The results are as follows:

| | Per cent |
| --- | --- |
| 10 min | 1.2 |
| 30 min | 1.9 |
| 1 hour | 2.5 |
| 2 hours | 2.7 |
| 3 hours | 3.6 |
| 5 hours | 3.9 |
| 24 hours | 6.4 |
| 48 hours | 8.0 |
| 72 hours | 8.5 |

In a comparative test, but using no lignin compound, water absorption at 3 hours, for example, was 5.6%.

When the dispersing agent is employed, the effect of the water-proofing agents described above, is so enhanced that lesser amounts of each can be employed; for example, as little as about 0.5% of the alkali metal rosin soap and about 0.25% to 0.3% of water soluble alkaline earth metal salt can be employed. Preferably, from 5% to 10% of residual fuel oil is employed in this embodiment although somewhat lesser amounts are also useful.

In the examples and tests given herein, water absorption is determined by ascertaining the increase in weight after immersion in water. The oil employed in these examples is a petroleum fraction known as Bunker C oil; and it has a specific gravity of 7.4 to 8.8 A. P. I., and flash point (closed cup) of from 205° F. to 212° F. Other heavy liquid petroleum fractions can be employed.

It is believed that the present process is so effective in waterproofing, or in imparting water-repellency to, gypsum products because the calcium abietate or calcium rosin soap, or other alkaline earth metal rosin soap, is deposited in intimate admixture with the gypsum crystals, and because it co-acts with the oil to disperse thoroughly and to maintain a water-repellent protective coating over the gypsum crystal surfaces. The soap and the calcium or other metal salt are thoroughly dispersed throughout the gypsum mass because they are added in solution, and the insoluble rosin soap is then believed to be precipitated in place and maintained in dispersion with the oil to enable the improved results obtained by this process. Whatever the mechanism of this reaction, the results, as demonstrated, are beyond what would be expected from a knowledge of the behavior of each ingredient alone.

In the specification and claims, percentages expressed are by weight, unless otherwise indicated. In general, it is advantageous to employ the higher amounts of the oil where the lower amounts of rosin soap are employed, in order to obtain the most economical results. By employing the amounts of rosin soap or abietate and soluble alkaline earth metal salt described herein, there is obtained, dispersed within the gypsum mass, from about 1.0% to about 2.7% of the insoluble alkaline earth metal rosin soap or abietate, on the dry basis. When a calcium or magnesium salt is employed, there will be from about 1.0% to about 2.0% of the corresponding rosin soap or abietate deposited within the set mass of gypsum crystals.

While the employment of higher drying temperatures is advantageous for the purpose of accelerating the drying of the gypsum products, such temperatures are not required in order to obtain the water-repellent effect of the compounds employed herein; and where speed of drying is not desired, or is not practicable, drying at room or air temperature is useful. It is to be understood that the usual modifying additives can be, and are, admixed in the calcined gypsum slurries where desired, as, for instance, in making wallboard or sheathing.

The above examples and specific description have been given for purposes of illustration only and it is to be understood that modifications and variations can be made therein without departing from the spirit and scope of the appended claims. Having now described the invention what is claimed is:

1. Process for producing a water repellent gypsum product which comprises intimately admixing a water slurry of calcined gypsum, from 1% to 2% by weight, calculated on the dry basis, of an alkali metal rosin soap, from 0.5% to 1.0%, calculated on the dry basis, of a water-soluble alkaline earth metal salt and from 5% to 10% by weight on the dry basis of residual fuel oil, forming into shape and drying.

2. Process as in claim 1 wherein said formed shape is dried at atmospheric temperature.

3. Process for producing a water repellent gypsum product which comprises intimately admixing a water slurry of calcined gypsum, from 1% to 2% by weight, calculated on the dry basis, of an alkali metal abietate, from 0.5% to 1.0%, calculated on the dry basis, of a water-soluble alkaline earth metal salt, and from 5% to 10% by weight calculated on the dry basis of residual fuel oil, forming into shape, and drying.

4. Process as in claim 3 wherein there is admixed from 1% to 2% by weight of potassium abietate.

5. Process as in claim 3 wherein there is admixed from 0.5% to 1.0% of a water-soluble calcium salt.

6. Process as in claim 3 wherein there is admixed from 0.5% to 1.0% of a water-soluble magnesium salt.

7. Process for producing a water repellent gypsum product which comprises admixing gypsum and residual fuel oil, calcining said admixture, forming a water slurry thereof, admixing with said water slurry from 1% to 2% by weight, calculated on the dry basis, of an alkali metal rosin soap and from 0.5% to 1.0% by weight, calculated on the dry basis, of a water-soluble alkaline earth metal salt, forming into shape, and drying, said residual fuel oil being added in an amount of from 5% to 10% by weight, calculated on the dry basis, of the total calcined gypsum composition.

8. Process as in claim 7 wherein said calcined gypsum slurry admixture is formed into wallboard.

9. Process as in claim 7 wherein there is admixed from 0.5% to 1.0% of a water-soluble calcium salt.

10. Process for making water repellent gypsum wallboard which comprises intimately admixing a water slurry of calcined gypsum, from 1% to 2% by weight, calculated on the dry basis, of an alkali metal rosin soap, from 0.5% to 1.0% by weight, calculated on the dry basis, of a water-soluble alkaline earth metal salt and from 5% to 10% by weight, on the dry basis, of residual fuel oil, forming said slurry admixture into wallboard, and drying.

11. Process as in claim 10 wherein said alkaline earth metal salt is a calcium salt.

12. Process as in claim 10 wherein said alkaline earth metal salt is a magnesium salt.

13. Process as in claim 10 wherein said rosin soap is sodium rosin soap.

14. Process for producing a water-repellent gypsum product which comprises intimately admixing a water slurry of calcined gypsum, 2% by weight, calculated on the dry basis, of potassium rosin soap, 0.7% by weight, calculated on the dry basis, of calcium chloride, and 10% by weight, calculated on the dry basis, of residual fuel oil, forming said slurry admixture into gypsum board, and drying.

15. Water-repellent gypsum product comprising a set mass of gypsum crystals protectively coated with uniformly dispersed precipitated alkaline earth metal rosin soap and residual fuel oil, said rosin soap being present in an amount of from 1.0% to 2.7% by weight and said oil being present in an amount of from 5% to 10% by weight.

16. Water-repellent gypsum wallboard comprising a gypsum core disposed within fibrous liners wherein said core comprises a set mass of gypsum crystals protectively coated with uniformly dispersed precipitated calcium rosin soap and residual fuel oil, said rosin soap being present in an amount of from 1.0% to 2.0% by weight and said oil being present in an amount of from 5% to 10% by weight calculated on the dry basis.

17. Water-repellent gypsum wallboard comprising a gypsum core disposed within fibrous liners wherein said core comprises a set mass of gypsum crystals protectively coated with uniformly dispersed precipitated calcium rosin soap and residual fuel oil, said rosin soap being present in an amount of 2.0% by weight and said residual fuel oil being present in an amount of 10% by weight.

18. Water-repellent gypsum product comprising a set mass of gypsum crystals protectively coated with uniformly dispersed precipitated magnesium rosin soap and residual fuel oil, said rosin soap being present in an amount of from 1.0% to 2.0% by weight, and said oil being present in an amount of from 5% to 10% by weight, calculated on the dry basis.

19. Water-repellent gypsum wallboard comprising a gypsum core disposed within fibrous liners wherein said core comprises a set mass of gypsum crystals protectively coated with from 5% to 10% by weight of residual fuel oil and from 1.0% to 2.0% by weight of at least one uniformly dispersed precipitated rosin soap chosen from the group consisting of calcium rosin soap and magnesium rosin soap.

20. Process for making a water repellent gypsum product which comprises intimately mixing a water slurry of calcined gypsum, from 0.5% to 2.0% by weight, on the dry basis, of an alkali metal rosin soap, from 0.25% to 1.0%, on the dry basis, of a water-soluble alkaline earth metal salt, from 5% to 10%, on the dry basis, of residual fuel oil, and from 0.1% to 0.5%, on the dry basis, of a dispersing agent.

WALLACE C. RIDDELL.
GEORGE B. KIRK.

REFERENCES CITED

The following references are of record in the file of this patent:

UNITED STATES PATENTS

| Number | Name | Date |
|---|---|---|
| 1,256,324 | Jump | Feb. 12, 1918 |
| 2,198,776 | King | Apr. 30, 1940 |
| 2,269,457 | Jurgensen | Jan. 13, 1942 |